(12) United States Patent
Ulman et al.

(10) Patent No.: US 11,711,320 B2
(45) Date of Patent: Jul. 25, 2023

(54) NETWORK DEVICE SAFETY PROTOCOL

(71) Applicant: MELLANOX TECHNOLOGIES, LTD., Yokneam (IL)

(72) Inventors: Sharon Ulman, Hayogev (IL); Eyal Srebro, Kefar Yehoshua (IL); Shay Aisman, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 17 days.

(21) Appl. No.: 17/372,555

(22) Filed: Jul. 12, 2021

(65) Prior Publication Data

US 2023/0008730 A1   Jan. 12, 2023

(51) Int. Cl.
| | | |
|---|---|---|
| *H04L 49/55* | (2022.01) | |
| *H04L 1/1607* | (2023.01) | |
| *H04L 43/0823* | (2022.01) | |
| *H04L 1/20* | (2006.01) | |
| *H04L 43/0852* | (2022.01) | |
| *H04L 1/00* | (2006.01) | |
| H04L 49/00 | (2022.01) | |

(52) U.S. Cl.
CPC .......... *H04L 49/555* (2013.01); *H04L 1/0061* (2013.01); *H04L 1/1628* (2013.01); *H04L 1/203* (2013.01); *H04L 43/0823* (2013.01); *H04L 43/0852* (2013.01); *H04L 49/30* (2013.01)

(58) Field of Classification Search
CPC ..... H04L 47/34; H04L 49/30; H04L 49/3063; H04L 49/50; H04L 49/55; H04L 1/0061; H04L 1/1628; H04L 1/203; H04L 43/0823; H04L 43/0852
See application file for complete search history.

(56) References Cited

U.S. PATENT DOCUMENTS

| | | | | |
|---|---|---|---|---|
| 2002/0093917 | A1* | 7/2002 | Knobbe | H04L 43/0811 370/252 |
| 2002/0118692 | A1* | 8/2002 | Oberman | H04L 49/3081 370/389 |
| 2006/0245428 | A1* | 11/2006 | Yanamoto | H04L 65/80 370/394 |
| 2007/0177502 | A1* | 8/2007 | Hama | H04L 1/1628 370/229 |
| 2011/0261821 | A1* | 10/2011 | Hillier, III | H04L 45/245 370/394 |

\* cited by examiner

*Primary Examiner* — Mohamed A Kamara
(74) *Attorney, Agent, or Firm* — Kligler & Associates Patent Attorneys Ltd

(57) ABSTRACT

In one embodiment, a network device, including packet processing circuitry, which includes at least one interface configured to receive packets, and packet forwarding circuitry configured to make respective forwarding decisions for respective ones of the packets, wherein the packet processing circuitry is configured to assign sequence numbers to the packets in at least one stage of packet processing, find missing packets in at least one corresponding later stage of the packet processing responsively to checking for missing sequence numbers among the assigned sequence numbers, and report the missing packets.

21 Claims, 5 Drawing Sheets

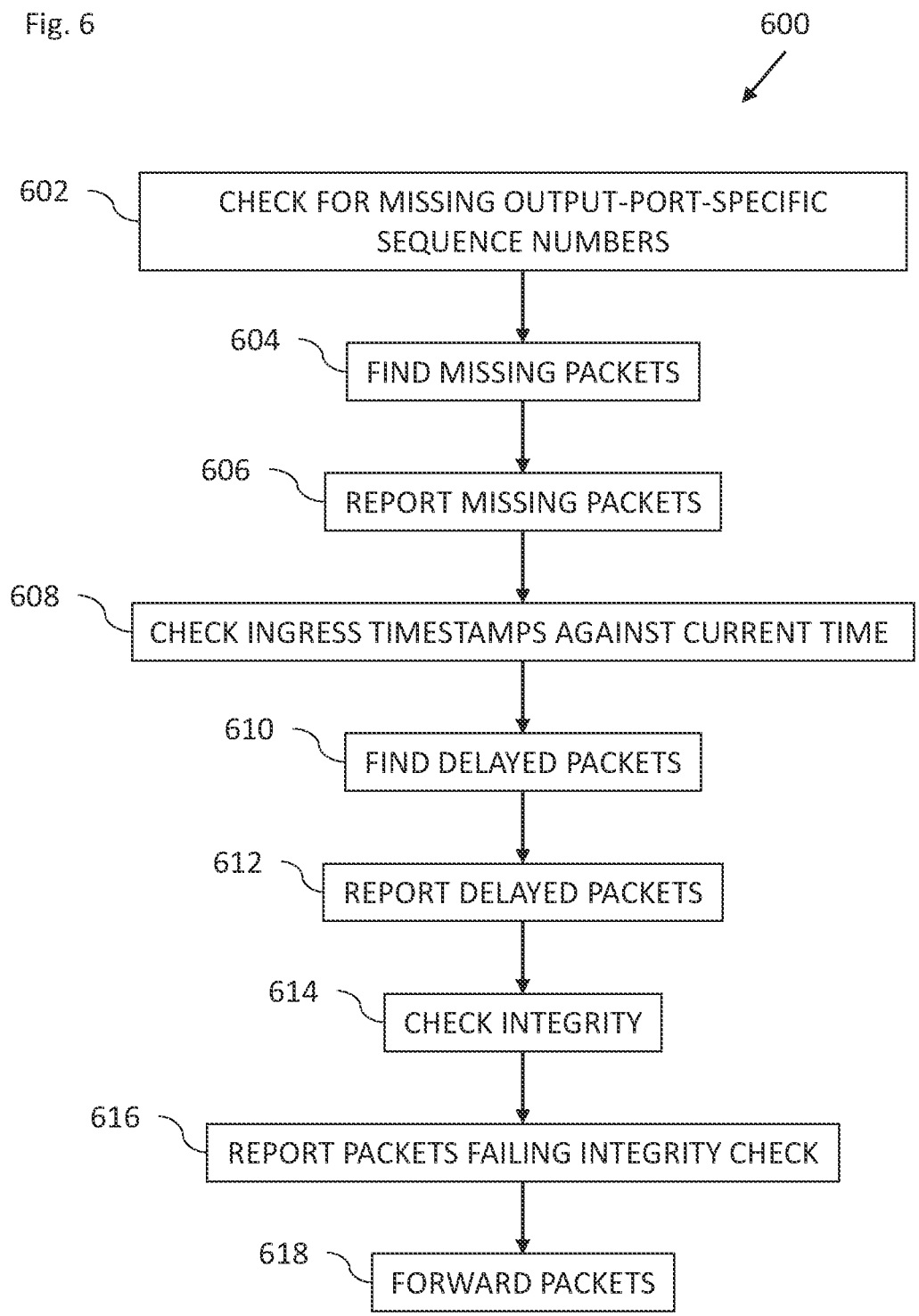

NETWORK DEVICE SAFETY PROTOCOL

FIELD OF THE INVENTION

The present invention relates to computing devices, and in particular, but not exclusively to, network devices.

BACKGROUND

A network interface controller (NIC) located between a network and a local central processing unit (CPU) and/or graphics processing unit (GPU) manages traffic between the local CPU and/or GPU and the network. The CPU and/or GPU may be exchanging data with a remote CPU and/or GPU over the network via another NIC.

Communication channels often use end-to-end safety protocols that include data integrity protection (e.g., cyclic redundancy check (CRC) code checks) to check for corruption, duplication and dropped packets (e.g., via packets sequence number checks), and packet delays (e.g., via time-based signatures such as using timestamps or sending keep alive packets between the two endpoints) in order to protect the channels from failure modes. In this approach both source and destination need to support the end-to-end safety protocol both in hardware and software.

This topology may be implemented in networks that need a high level of reliability (e.g., automotive networks) to ensure that packets (especially packets including sensitive data) are not lost on the way over the network, e.g., from a server to a car, or vice-versa. Automotive safety applications often comply with ISO-26262, which describes safety protocols to be used in an end-to-end system.

SUMMARY

There is provided in accordance with an embodiment of the present disclosure, a network device, including packet processing circuitry including at least one interface configured to receive packets, and packet forwarding circuitry configured to make respective forwarding decisions for respective ones of the packets, wherein the packet processing circuitry is configured to assign sequence numbers to the packets in at least one stage of packet processing, find missing packets in at least one corresponding later stage of the packet processing responsively to checking for missing sequence numbers among the assigned sequence numbers, and report the missing packets.

Further in accordance with an embodiment of the present disclosure, the device includes a silicon chip including the packet processing circuitry, the at least one interface including a plurality of ports, ones of the ports configured to be input ports, and others of the ports configured to be output ports, the silicon chip being configured to verify behavioral integrity of the silicon chip from the input ports to the output ports.

Still further in accordance with an embodiment of the present disclosure the at least one interface includes a plurality of ports, ones of the ports configured to be input ports, the input ports are configured to receive the packets and assign input-port-specific sequence numbers to the received packets, and the packet forwarding circuitry is configured to find missing ones of the received packets responsively to checking for missing input-port-specific sequence numbers among the assigned input-port-specific sequence numbers.

Additionally in accordance with an embodiment of the present disclosure the at least one interface includes a plurality of ports, ones of the ports configured to be output ports to forward one of the packets, the packet forwarding circuitry is configured to assign output-port-specific sequence numbers to processed ones of the packets, and the output ports are configured to find missing ones of the processed packets responsively to checking for missing output-port-specific sequence numbers among the assigned output-port-specific sequence numbers.

Moreover in accordance with an embodiment of the present disclosure the at least one interface includes a plurality of ports, ones of the ports configured to be input ports to receive the packets, and one of the ports configured to be output ports to forward ones of the packets, and the packet forwarding circuitry is configured to receive the respective packets from the input ports, make respective forwarding decisions for the respective packets to determine respective ones of the output ports to which to forward the respective packets, assign input-output port specific sequence numbers to the respective packets in a first stage of the packet processing responsively to respective input-output port combinations of the respective packets, and find missing ones of the respective packets in a second stage of the packet processing responsively to checking for missing input-output port specific sequence numbers among the assigned input-output port specific sequence numbers.

Further in accordance with an embodiment of the present disclosure the input ports are configured to assign input-port-specific sequence numbers to the received packets, and the packet forwarding circuitry is configured to find missing ones of the received packets responsively to checking for missing input-port-specific sequence numbers among the assigned input-port-specific sequence numbers.

Still further in accordance with an embodiment of the present disclosure the packet forwarding circuitry is configured to assign output-port-specific sequence numbers to processed ones of the packets after the second stage of the packet processing, and the output ports are configured to find missing ones of the processed packets responsively to checking for missing output-port-specific sequence numbers among the assigned output-port-specific sequence numbers.

Additionally, in accordance with an embodiment of the present disclosure the input ports are configured to assign ingress timestamps to the received packets, and the output ports are configured to find delayed ones of the packets exceeding a given processing delay in the packet processing responsively to checking respective ones of the ingress timestamps against a current time, and report the delayed packets exceeding the given processing delay.

Moreover, in accordance with an embodiment of the present disclosure each of the received packets includes a respective integrity check code, the packet processing circuitry is configured to check the integrity check code of respective ones of the received packets, and report ones of the packets failing the integrity check.

Further in accordance with an embodiment of the present disclosure the at least one interface includes a plurality of ports, ones of the ports are configured to be input ports to receive the packets and assign ingress timestamps to the received packets, one of the ports are configured to be output ports and to forward ones of the packets, find delayed ones of the packets exceeding a given processing delay in the packet processing responsively to checking respective ones of the ingress timestamps against a current time, and report the delayed packets exceeding the given processing delay.

Still further in accordance with an embodiment of the present disclosure the at least one interface is configured to be connected to a data packet network.

Additionally, in accordance with an embodiment of the present disclosure the at least one interface includes a network interface configured to be connected to a data packet network, and a peripheral bus interface configured to be connected to a host device.

There is also provided in accordance with another embodiment of the present disclosure, a networking method, including receiving packets, making respective forwarding decisions for respective ones of the packets, assigning sequence numbers to the packets in at least one stage of packet processing, finding missing packets in at least one corresponding later stage of the packet processing responsively to checking for missing sequence numbers among the assigned sequence numbers, and reporting the missing packets.

Moreover, in accordance with an embodiment of the present disclosure the assigning includes assigning input-port-specific sequence numbers to the received packets, and the finding includes finding missing ones of the received packets responsively to checking for missing input-port-specific sequence numbers among the assigned input-port-specific sequence numbers.

Further in accordance with an embodiment of the present disclosure the assigning includes assigning output-port-specific sequence numbers to processed ones of the packets, and the finding includes finding missing ones of the processed packets responsively to checking for missing output-port-specific sequence numbers among the assigned output-port-specific sequence numbers.

Still further in accordance with an embodiment of the present disclosure the making includes making respective forwarding decisions for the respective packets to determine respective output ports to which to forward the respective packets, the assigning includes assigning input-output port specific sequence numbers to the respective packets in a first stage of the packet processing responsively to respective input-output port combinations of the respective packets, and the finding includes finding missing ones of the respective packets in a second stage of the packet processing responsively to checking for missing input-output port specific sequence numbers among the assigned input-output port specific sequence numbers.

Additionally, in accordance with an embodiment of the present disclosure the assigning includes assigning input-port-specific sequence numbers to the received packets, and the finding includes finding missing ones of the received packets responsively to checking for missing input-port-specific sequence numbers among the assigned input-port-specific sequence numbers.

Moreover, in accordance with an embodiment of the present disclosure the assigning includes assigning output-port-specific sequence numbers to processed ones of the packets after the second stage of the packet processing, and the finding includes finding missing ones of the processed packets responsively to checking for missing output-port-specific sequence numbers among the assigned output-port-specific sequence numbers.

Further in accordance with an embodiment of the present disclosure, the method includes assigning ingress timestamps to the received packets, finding delayed ones of the packets exceeding a given processing delay in the packet processing responsively to checking respective ones of the ingress timestamps against a current time, and reporting the delayed packets exceeding the given processing delay.

Still further in accordance with an embodiment of the present disclosure each of the received packets includes a respective integrity check code, the method further including checking the integrity check code of respective ones of the received packets, and reporting ones of the packets failing the integrity check.

Additionally, in accordance with an embodiment of the present disclosure, the method includes assigning ingress timestamps to the received packets, forwarding ones of the packets, finding delayed ones of the packets exceeding a given processing delay in the packet processing responsively to checking respective ones of the ingress timestamps against a current time, and reporting the delayed packets exceeding the given processing delay.

BRIEF DESCRIPTION OF THE DRAWINGS

The present invention will be understood from the following detailed description, taken in conjunction with the drawings in which:

FIG. 6 is a flowchart including steps in a method of operation of output ports of the network device of FIG. 2.

DESCRIPTION OF EXAMPLE EMBODIMENTS

Overview

Figure 1:
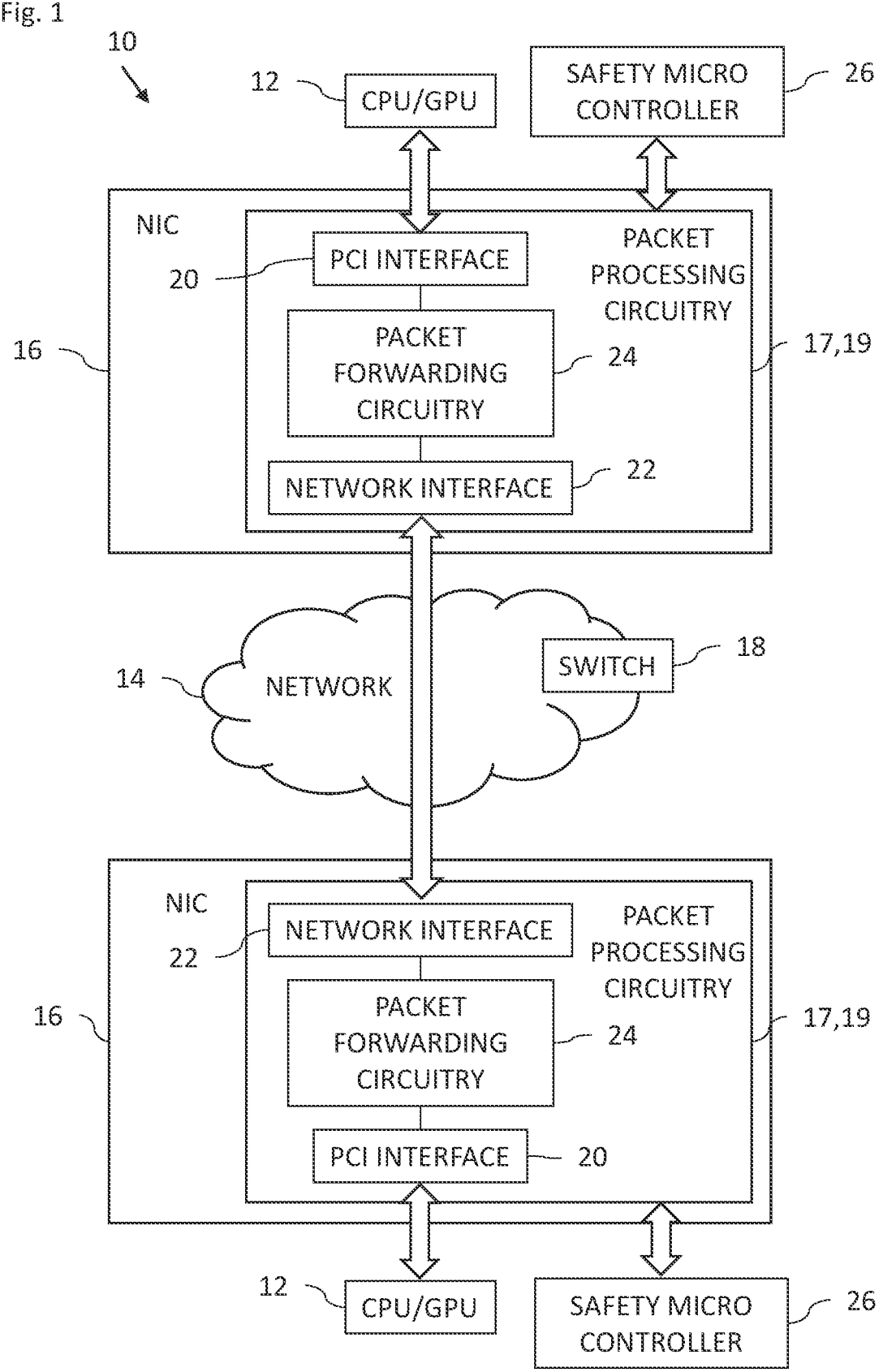
FIG. 1 is a block diagram view of a computer system constructed and operative in accordance with an embodiment of the present invention.

When one of the endpoint devices does not, or cannot, support end to end safety, one or more of the components (e.g., CPU and/or GPU, NIC and the network) along the packets' route may implement independent safety mechanisms and cannot rely on the neighboring component or device. Implementing a safety concept in a system on chip (SOC) design may include partitioning the SOC into independent units (e.g., CPU, interface controller, bus matrix, memories, etc.), proving independency of each unit, and identifying each unit's failure mode(s). Safety mechanisms may then be developed for each unit to address the corresponding identified failure modes. The above solution is generally not possible for a network device (such as a smart NIC, or switch) in which the units of the network device are not neatly partitioned. For example, the design of a network device may include a mixture of data-path, controller and processing unit design, and it is difficult to analyze each unit's failure modes independently since each unit is deeply related to a neighboring unit or units. In such a case, the safety of the network device may be implemented using expensive power and area safety mechanisms (e.g., lockstep or error checking and correcting (ECC)).

Therefore, embodiments of the present invention solve the above problems by applying a safety protocol from the input to the output of a network device such as a NIC or a switch. In some embodiments, the network device includes a silicon chip performing some or all of the functions of the network device. The safety protocol verifies behavioral integrity of the silicon chip and protects from safety violation due to random failures that may occur on data and logic control.

Packet duplication and drops are checked by assigning a sequence number to each received packet. The sequence number of each packet is subsequently checked in the network device. Missing packets are identified based on skips in the sequence numbers of the checked packets.

Packet integrity may also be checked by checking a CRC of each packet. Packet delay in the network device may also be checked by comparing a current time with an ingress timestamp assigned to each packet upon receipt in the network device.

In some embodiments, different sequence numbers are assigned to each packet at corresponding different packet processing stages within the network device, for checking at corresponding later stages in the packet processing. For example, a first sequence number is assigned to a packet in a first stage of packet processing, for checking in a second stage of packet processing, then a second sequence number is assigned to that packet in the second stage for checking in a third stage.

In some embodiments, packets received by the network device may be assigned sequence numbers according to input ports receiving the packets. For example, packets received by input port A may be assigned sequence numbers of series A, and packets received by input port B may be assigned sequence numbers of series B. In this manner, there may be as many sequence number series as there are input ports so that each input port can assign sequence numbers to received packets according to its own series of sequence numbers without having to know about the sequence numbers assigned by other input ports.

Each packet received by the network device typically includes a CRC of that packet computed by an originator of that packet, e.g., a local or remote CPU or GPU. The CRC may be used, e.g., at a later stage of packet processing, to check packet integrity.

The packets received by the input ports are then forwarded to packet forwarding circuitry in the network device. The packet forwarding circuitry makes forwarding decisions as to which output ports each of the packets should be forwarded to and performs the forwarding to the respective ports. The sequence number of each packet is checked by packet forwarding circuitry (e.g., switching circuitry or peripheral component interconnect (PCI) bridge) of the network device according to the series of the assigned sequence numbers. For example, missing packets from input port A are identified with respect to the series A sequence numbers, and so on.

The packet forwarding circuitry then assigns new sequence numbers to each packet (replacing the existing one) according to the input port from which that packet was received and the output port to which that packet will be assigned. For example, if a packet arrives from input port C and is assigned to output port E, the packet receives a sequence number of the C:E series and if a packet arrives from input port C and is assigned to output port F, the packet receives a sequence number of the C:F series. The sequence numbers assigned at this stage are input-output port-specific due to the need to keep track of each unique flow (e.g., input-output port combination) within the network device. In this manner, the packet forwarding circuitry can easily track sequence numbers as packets from any input port may be assigned to any output port and are treated as separate flows in the packet forwarding circuitry. The input-output port-specific sequence number of each packet is then checked towards the end of the packet processing in the packet forwarding circuitry. The reason the sequence numbers are checked at the end of the packet processing circuitry is to ensure that packets make it safely across the packet forwarding circuitry which performs many processes including managing queues and arbitration, among other tasks. The packet forwarding circuitry then assigns new sequence numbers to the packets (replacing the existing sequence numbers) according to the output ports to which the packets are assigned. For example, packets destined for output port D may be assigned sequence numbers of series D, and packets destined for output port F may be assigned sequence numbers of series F. In this manner, there may be as many sequence number series as there are output ports so that each output port can easily check the sequence numbers of received packets according to its own series of sequence numbers without having to know about the sequence numbers assigned to other output ports. The packets are then transferred to the respective output ports, which check the sequence numbers of the received packets.

The different sequence number checks allow the network device to identify missing or duplicated packets at different stages in packet processing based on missing or duplicate sequence numbers in the respective series. The network device may then report missing or duplicated packets to a designated local or remote entity, such as an external safety microcontroller (MCU), e.g., via an interrupt-based protocol.

The output ports may also check an integrity of the packets (for example based on the CRC of each respective packet). If a packet is modified by the network device at any stage, a new CRC is typically generated and replaces the existing CRC.

The output ports may also check a delay of the packets in the network device based on ingress timestamps (assigned to each packet by the respective input port), and a current time (e.g., based on an internal clock of the network device). The network device may report packets which failed the integrity check and/or are delayed too long in the network device to the designated local or remote entity.

In the above example, the network device may be a NIC in which input ports may be configured on an PCI interface connecting the network device to a local CPU or GPU, and output ports may be configured on an Ethernet interface connecting the NIC to a network. In another example, the network device may be a NIC in which input ports may be configured on the Ethernet interface, and output ports may be configured on the PCI interface. In some examples, as the NIC is generally dealing with two-way traffic, the input and output ports may be configured on both the PCI interface and the Ethernet interface. In yet another example, the network device may be a switch in which the input port and output ports are configured on an Ethernet interface connecting the switch to the network.

System Description

Reference is now made to FIG. 1, which is a block diagram view of a computer system 10 constructed and operative in accordance with an embodiment of the present invention. The computer system 10 includes two endpoint devices 12 communicating with each other over a data packet network 14. Each endpoint devices 12 may include a CPU and/or GPU. The GPU may be configured to implement a graphics rendering pipeline to perform various operations related to generating pixel data based on graphics data supplied by a central processing unit (CPU). GPUs are employed to generate three-dimensional (3D) graphics objects and two-dimensional (2D) graphics objects for a variety of applications, including feature films, computer games, virtual reality (VR) and augmented reality (AR) experiences, mechanical design, and/or the like.

Each endpoint devices 12 is connected to a network interface controller 16 to enable communication over the network 14. In some embodiments, each network interface controller 16 may serve one or more endpoint devices 12 and have one or more ports to the network 14. For example, each of the network interface controllers 16 may serve multiple endpoint devices 12, or one of the network interface controllers 16 may serve one endpoint devices 12, while the other network interface controller 16 may serve multiple endpoint devices 12. Each network interface controller 16 may include packet processing circuitry 17, which may include a peripheral bus interface 20 (e.g., PCI interface) configured to be connected with a host device such as the local endpoint device 12, a network interface 22 (e.g., Ethernet interface) configured to be connected to the network 14, and packet forwarding circuitry 24 to make forwarding decisions for packets received from the peripheral bus interface 20 or the network interface 22. In some embodiments, the packet processing circuitry 17 may be comprised in a silicon chip 19 of the network interface controller 16.

The network 14 may include one or more switches 18. Each switch 18 may also include a network interface (not shown) and packet forwarding circuitry (not shown). One or more of the network interface controllers 16 and/or the switches 18 may implement an intra-device safety protocol as described in more detail with reference to FIG. 2. The computer system 10 also includes one or more entities 26 (e.g., safety microcontrollers) to which safety irregularities are reported.

Figure 2:
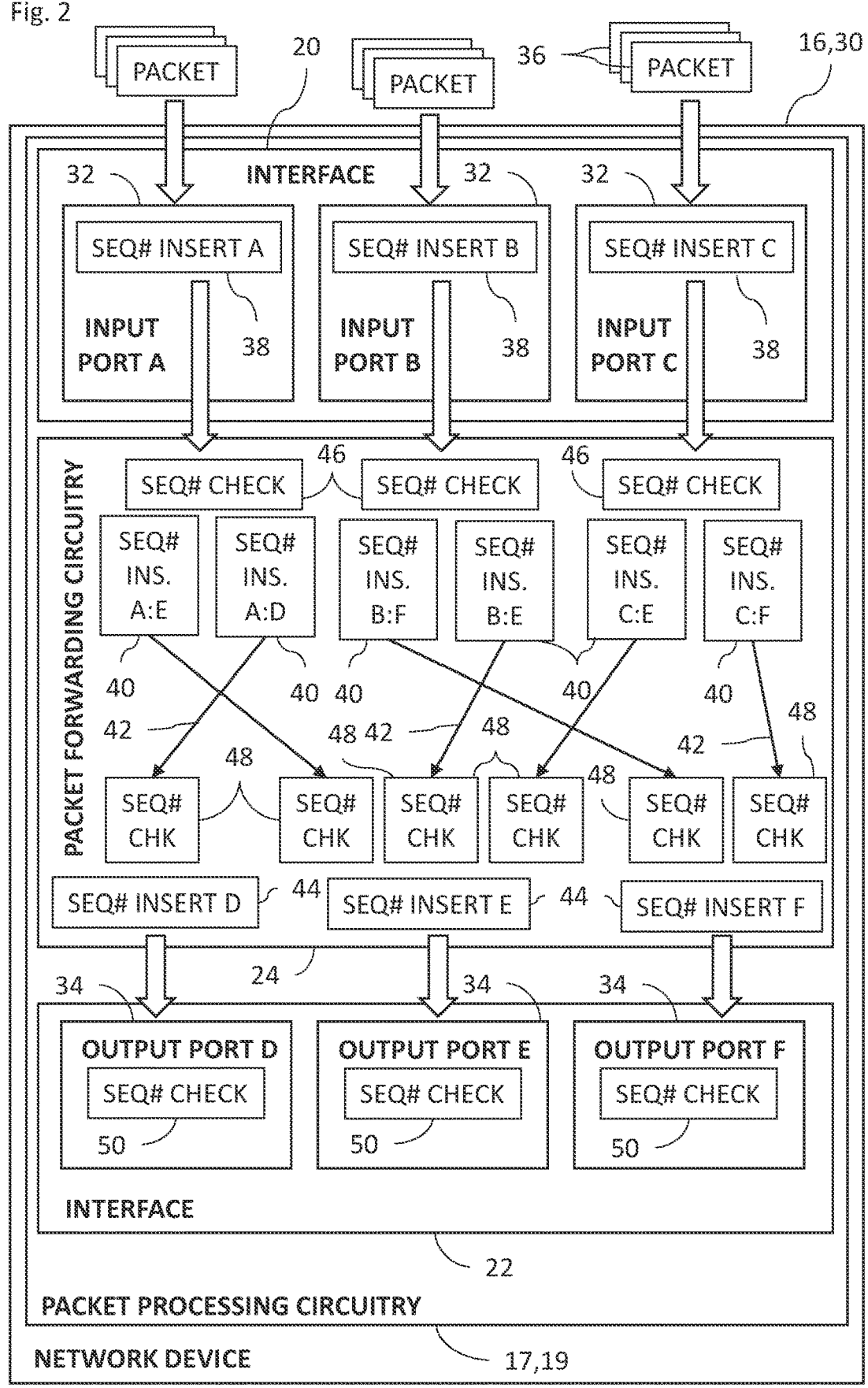
FIG. 2 is a block diagram view of a network device for use in the system of FIG. 1.

Reference is now made to FIG. 2, which is a block diagram view of a network device 30 for use in the system 10 of FIG. 1. For the sake of simplicity, the description provided below with reference to FIGS. 2-6 assumes that the network device 30 is one of the network interface controllers 16. However, the network device 30 may be implemented as one of the switches 18 or any suitable network device. For the sake of simplicity, the description provided below with reference to FIGS. 2-6 assumes that input ports 32 are configured on the peripheral bus interface 20 and output ports 34 are configured on the network interface 22. However, the network device 30 may be configured with input ports on the network interface 22 and output ports on the peripheral bus interface 20 or with input and output ports on both the peripheral bus interface 20 and the network interface 22. In embodiments where the network device 30 is implemented as one of the switches 18, the input and output ports may be implemented on the same network interface.

FIG. 2 shows packets 36 (only some labeled for the sake of simplicity) received from the endpoint devices 12 or peripheral devices (e.g., storage devices). The input ports 32 of the peripheral bus interface 20 receive the packets 36. In embodiments where input ports are configured on the network interface 22, the packets 36 are received from the network 14. The input ports 32 assign input-port specific sequence numbers 38 to the packets 36 and ingress timestamps, as described in more with reference to FIG. 4. The input-port specific sequence numbers 38 are inserted into a header field of the packets 36.

The packet forwarding circuitry 24 receives the packets 36 and makes forwarding decisions for the packets 36 (e.g., which of the output ports 34 should the packets 36 be forwarded to). The packet forwarding circuitry 24 checks (blocks 46) the input-port specific sequence numbers 38 and assigns input-output port specific sequence numbers 40 to the packets 36 according to unique flows 42 (only some labeled for the sake of simplicity) of respective input-output port combinations of the respective packets 36, described in more detail with reference to FIG. 5. The input-output port specific sequence numbers 40 replace the input-port specific sequence numbers 38 in the packets 36. The packet forwarding circuitry 24 processes the packets 36 in their respective unique flows 42.

The input-output port specific sequence numbers 40 are checked (blocks 48) towards the end of the packet processing in the packet forwarding circuitry 24, and the packet forwarding circuitry 24 assigns output-port specific sequence numbers 44 to the packets 36 (replacing the input-output port specific sequence numbers 40 in the packets 36). The packets 36 are then forwarded to their respective output ports 34.

The respective output ports 34 check (blocks 50) the respective output-port specific sequence numbers 44, check a delay of the packets 36 in the network device 30, and perform integrity checks of the packets 36, described in more detail with reference to FIG. 6. The output ports 34 forward the packets over the network 14 (or to the endpoint devices 12 when the output ports 34 are implemented on the peripheral bus interface 20).

The safety protocol implemented using the sequence number checks, and/or the integrity checks of the packets, and/or the delay checks, verify behavioral integrity of the silicon chip 19 of the network device 30 from entry to exit of the silicon chip 19 (from the input ports 32 to the output ports 34) and protects from safety violation of the silicon chip 19 due to random failures that may occur on data and logic control.

In practice, some or all of the functions of the packet forwarding circuitry 24 may be combined in a single physical component or, alternatively, implemented using multiple physical components. These physical components may comprise hard-wired or programmable devices, or a combination of the two. In some embodiments, at least some of the functions of the packet forwarding circuitry 24 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 3:
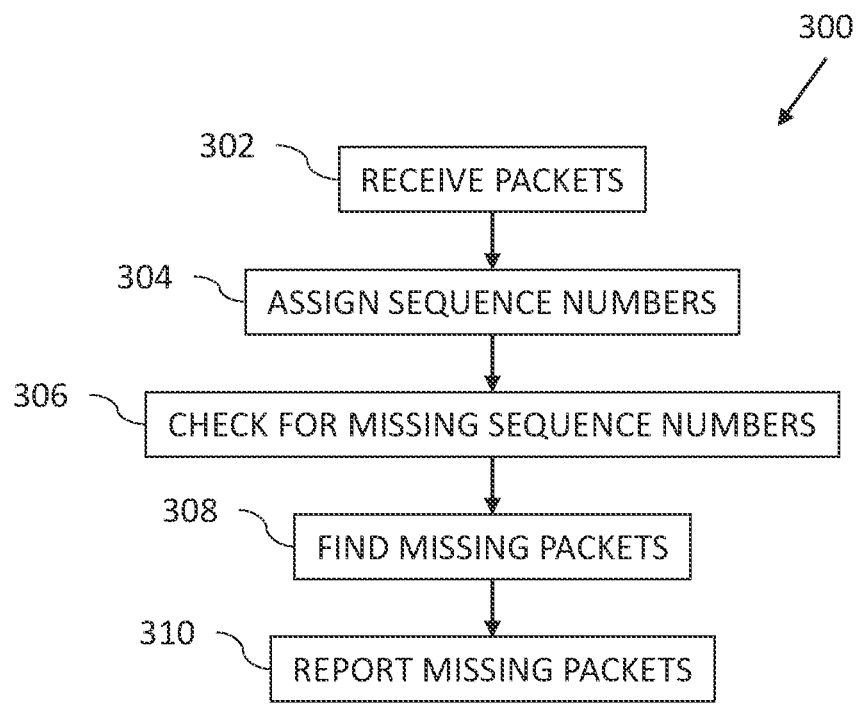
FIG. 3 is a flowchart including steps in a safety method of operation of the network device of FIG. 2.

Reference is now made to FIG. 3, which is a flowchart 300 including steps in a safety method of operation of the network device 30 of FIG. 2. Reference is also made to FIG. 2. The peripheral bus interface 20 is configured to receive (block 302) the packets 36. In general, the packet processing circuitry 17 is configured to assign (block 304) sequence numbers 38, 40, 44 to the packets 36 in at least one stage of packet processing. The packet processing circuitry 17 is configured to check (block 306) for missing sequence numbers 38, 40, 44 among the assigned sequence numbers 38, 40, 44 in at least one corresponding later stage of packet processing (i.e., sequence numbers are assigned in one stage and checked in a later stage of packet processing). The packet processing circuitry 17 is configured to find (block 308) missing packets 36 in at least one corresponding later stage of packet processing responsively to the checking for missing sequence numbers 38, 40, 44 among the assigned sequence numbers 38, 40, 44. The packet processing circuitry 17 is configured to report (block 310) the missing packets 36 to one or more of the entities 26 (FIG. 1).

Figure 4:
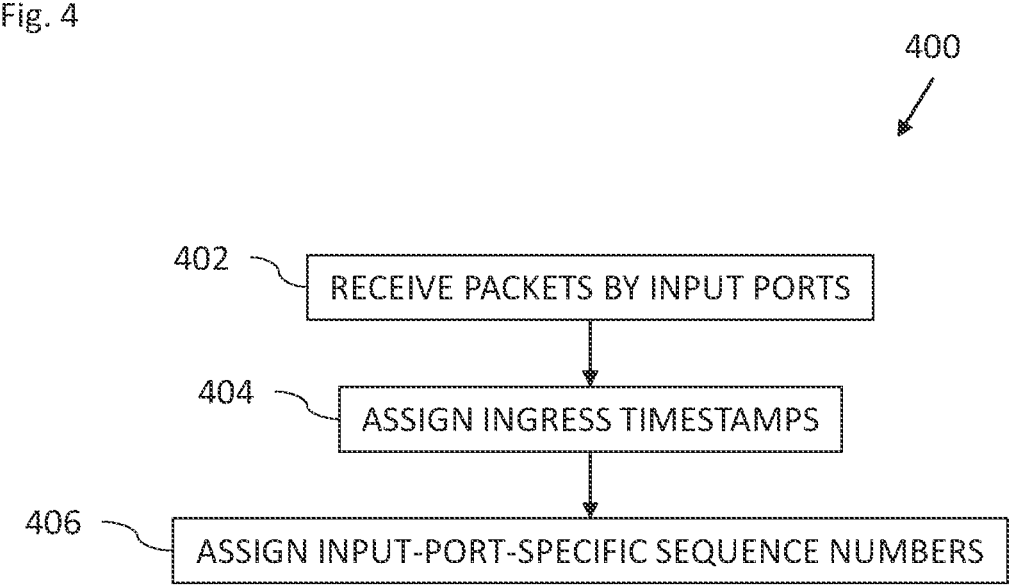
FIG. 4 is a flowchart including steps in a method of operation of input ports of the network device of FIG. 2.

Reference is now made to FIG. 4, which is a flowchart 400 including steps in a method of operation of input ports 32 of the network device 30 of FIG. 2. Reference is also made to FIG. 2. The input ports 32 are configured to receive (block 402) the packets 36. Each of the received packets 36 includes a respective integrity check code (e.g., CRC) computed by an originator of the packet, such as one of the endpoint devices 12 (e.g., a local or remote CPU or GPU). The CRC may be used, e.g., at a later stage of packet processing, to check packet integrity. The input ports 32 are configured to assign (block 404) respective ingress timestamps to the receive packets 36, e.g., based on a current time of a clock running in the network device 30. The input ports 32 are configured to assign (block 406) the input-port specific sequence numbers 38 to the received packets 36. For example, packets 36 received by input port A may be assigned sequence numbers of series A, and packets 36 received by input port B may be assigned sequence numbers of series B. Series A and B are independent sequence number series. In this manner, there may be as many sequence number series as there are input ports 32 so that each input port 32 (which typically processes the packets 36 independently of other ones of the input ports 32) can assign sequence numbers to received packets 36 according to its own series of sequence numbers without having to know about the sequence numbers assigned by other input ports 32. The packets 36 received by the input ports 32 are then forwarded to packet forwarding circuitry 24 circuitry in the network device 30.

Figure 5:
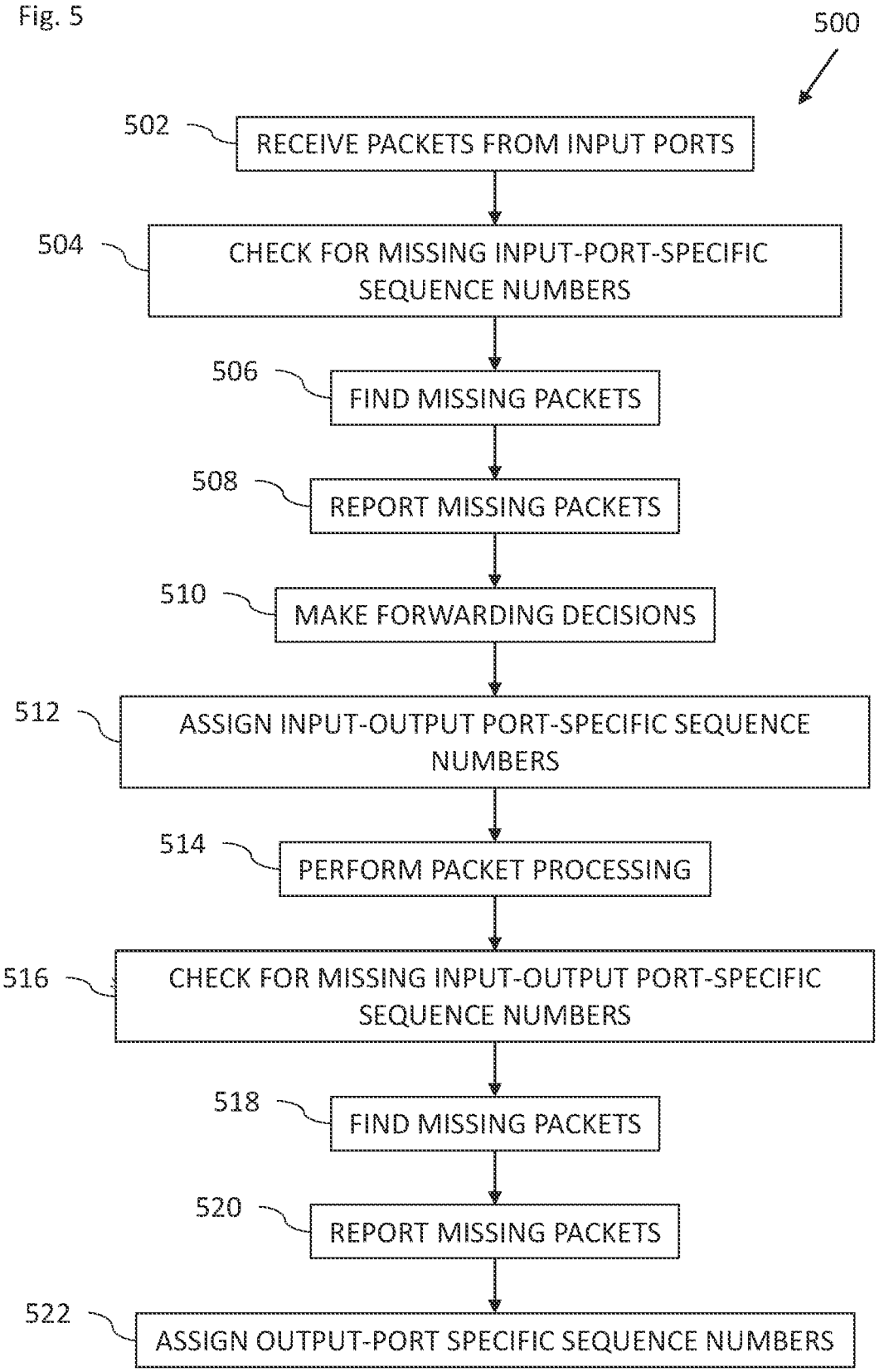
FIG. 5 is a flowchart including steps in a method of operation of packet forwarding circuitry of the network device of FIG. 2.

Reference is now made to FIG. 5, which is a flowchart 500 including steps in a method of operation of packet forwarding circuitry 24 of the network device 30 of FIG. 2. Reference is also made to FIG. 2.

The packet forwarding circuitry 24 is configured to receive (block 502) the respective packets 36 from the input ports 32. The packet forwarding circuitry 24 is configured to check (block 504) for missing input-port specific sequence numbers 38 among the assigned input-port-specific sequence numbers 38. In other words, missing sequence numbers are checked per sequence. For example, missing packets from input port A are identified with respect to the missing series A sequence numbers, and so on. The packet forwarding circuitry 24 is configured to find (block 506) missing ones of the received packets 36 responsively to the checking for missing input-port-specific sequence numbers 38 among the assigned input-port-specific sequence numbers 38. For example, if a packet with a series A sequence number is received having a sequence number of 100002, and the next packet received with a series A sequence number has a sequence number of 100004, the packet of sequence number 100003 is deemed missing. The packet forwarding circuitry 24 is configured to report (block 508) the missing packets 36 to one or more of the entities 26 (FIG. 1) responsively to the finding and checking of the steps of blocks 506 and 508.

The packet forwarding circuitry 24 is configured to make (block 510) respective forwarding decisions for respective ones of the packets 36 to determine respective ones of the output ports 34 to which to forward the respective packets 36. The forwarding decisions may be made according to the source and destination IP addresses in the headers of the packets, among other factors. In response to making the forwarding decisions (i.e., knowing the output ports 34 of the packets 36), the packet forwarding circuitry 24 is configured to assign (block 512) input-output port specific sequence numbers 40 to the respective packets in a first stage of the packet processing in the packet forwarding circuitry 24 responsively to respective input-output port combinations of the respective packets 36. For example, if a packet arrives from input port C and is assigned to output port E, the packet receives a sequence number of the C:E series of sequence numbers and if a packet arrives from input port C and is assigned to output port F, the packet receives a sequence number of the C:F series of sequence numbers. The input-output port specific sequence numbers 40 assigned at this stage are input-output port-specific due to the need to keep track of each unique flow 42 (e.g., input-output port combination) within the network device 30. In this manner, the packet forwarding circuitry 24 can easily track sequence numbers as packets 36 from any input port 32 may be assigned to any output port 34 and are treated as separate flows 42 in the packet forwarding circuitry 24. In some embodiments, different hardware components of the packet forwarding circuitry 24 may be processing the separate flows 42 and therefore may be unaware of the sequence number series used by other flows 42. The input-output port specific sequence numbers 40 typically replace the input-port specific sequence numbers 38 in the respective packets 36.

The packet forwarding circuitry 24 is configured to perform (block 514) packet processing of the various packets 36 in the respective flows 42 in a second stage of the packet processing. The second stage may include one or more sub-stages, including managing queues and arbitration. The packet forwarding circuitry 24 is configured to check (block 516) for missing input-output port specific sequence numbers 40 among the assigned input-output port specific sequence numbers 40 in a third stage of the packet processing. In other words, missing sequence numbers 40 are checked per sequence. For example, missing packets from input port A to be forwarded to output port E are identified with respect to the missing series A:E sequence numbers, and so on.

The packet forwarding circuitry 24 is configured to find (block 518) missing ones of the respective packets 36 in the third stage of the packet processing responsively to the checking for missing input-output port specific sequence numbers 40 among the assigned input-output port specific sequence numbers 40 in the step of block 516. For example, if a packet with a series A:E sequence number is received having a sequence number of 100010, and the next packet received with a series A:E sequence number has a sequence number of 100012, the packet of sequence number 100011 is deemed missing. The packet forwarding circuitry 24 is configured to report (block 520) the missing packets 36 to one or more of the entities 26 (FIG. 1) responsively to the finding and checking of the steps of blocks 516 and 518. One reason the input-output port specific sequence numbers 40 of the packets 36 are checked towards the end of the packet processing in the packet forwarding circuitry 24 is to ensure that packets 36 made it safely across the packet forwarding circuitry 24, which performs many processes including managing queues and arbitration, among other tasks.

The packet forwarding circuitry 24 is configured to assign (block 522) output-port specific sequence numbers 44 to the packets 36 after the third stage of the packet processing. For example, packets destined for output port D may be assigned sequence numbers of series D, and packets destined for output port F may be assigned sequence numbers of series F. In this manner, there may be as many sequence number series as there are output ports 34 so that each output port 34 can easily check the sequence numbers of received packets 36 according to its own series of sequence numbers without having to know about the sequence numbers assigned to other output ports 34. The packets 36 are then forwarded to the respective output ports 34.

Reference is now made to FIG. 6, which is a flowchart 600 including steps in a method of operation of the output ports 34 of the network device 30 of FIG. 2. Reference is also made to FIG. 2.

The steps described below describe the output ports 34 performing operations with respect to respective ones of the packets 36. In other words, each output port 34 performs the operations described below for the packets 36 received by that output port 34 from the packet forwarding circuitry 24.

The output ports 34 are configured to check (block 602) for missing output-port specific sequence numbers 44 among the assigned output-port-specific sequence numbers 44. In other words, missing output-port specific sequence numbers 44 are checked per sequence series. For example, missing packets for output port D are identified with respect to the missing series D sequence numbers, and so on.

The output ports 34 are configured to find (block 604) missing ones of processed packets 36 responsively to checking for missing output-port-specific sequence numbers 44 among the assigned output-port-specific sequence numbers 44. For example, if a packet with a series E sequence number is received by port E having a sequence number of 100006, and the next packet received by port E with a series E sequence number has a sequence number of 100008, the packet of sequence number 100007 is deemed missing. The output ports 34 are configured to report (block 606) the missing packets 36 to one or more of the entities 26 (FIG. 1) responsively to the finding and checking of the steps of blocks 604 and 606.

The output ports 34 are configured to check (block 608) respective ingress timestamps of respective ones of the packets 36 against a current time that each respective packet 36 is processed by a respective one of the output ports 34. The output ports 34 are configured to find (block 610) delayed ones of the packets 36 exceeding a given processing delay in the packet processing responsively to checking the respective ingress timestamps against a current time. In other words, a delayed packet is defined as a packet in which its assigned ingress time stamp is older than the given processing delay. The output ports 34 are configured to report (block 612) respective ones of the delayed packets 36 exceeding the given processing delay to one or more of the entities 26 (FIG. 1).

The output ports 34 are configured to check (block 614) the integrity check code of respective received packets 36 (for example based on the CRC of each packet 36). If a packet is modified by the network device 30 at any stage, a new CRC is typically generated for that packet and replaces the existing CRC of that packet. The output ports 34 are configured to report (block 616) packets 36 failing the integrity check to one or more of the entities 26 (FIG. 1). The output ports 34 are configured to forward (block 618) packets 36 (e.g., over the network 14 or a local one of the endpoint devices 12).

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A network device, comprising packet processing circuitry including:
   at least one interface configured to receive packets; and
   packet forwarding circuitry configured to make respective forwarding decisions for respective ones of the packets, wherein the packet processing circuitry is configured to:
      assign input-output port specific sequence numbers to the respective packets in a first stage of packet processing by the packet processing circuitry responsively to respective input-output port combinations of the respective packets;
      check for missing input-output port specific sequence numbers among the assigned input-output port specific sequence numbers in a second stage of packet processing by the packet processing circuitry after the first stage of packet processing by the packet processing circuitry in which the input-output port specific sequence numbers were assigned;
      find missing ones of the respective packets in the second stage of the packet processing responsively to the missing input-output port specific sequence numbers; and
      report the missing packets.

2. The device according to claim 1, further comprising a silicon chip including the packet processing circuitry, the at least one interface including a plurality of ports, ones of the ports configured to be input ports, and others of the ports configured to be output ports, the silicon chip being configured to verify behavioral integrity of the silicon chip from the input ports to the output ports.

3. The device according to claim 1, wherein:
   the at least one interface includes a plurality of ports, ones of the ports configured to be input ports;
   the input ports are configured to receive the packets and assign input-port-specific sequence numbers to the received packets; and
   the packet forwarding circuitry is configured to find missing ones of the received packets responsively to checking for missing input-port-specific sequence numbers among the assigned input-port-specific sequence numbers.

4. The device according to claim 1, wherein:
   the at least one interface includes a plurality of ports, ones of the ports configured to be output ports to forward one of the packets;
   the packet forwarding circuitry is configured to assign output-port-specific sequence numbers to processed ones of the packets; and
   the output ports are configured to find missing ones of the processed packets responsively to checking for missing output-port-specific sequence numbers among the assigned output-port-specific sequence numbers.

5. The device according to claim 1, wherein:
   the at least one interface includes a plurality of ports, ones of the ports configured to be input ports to receive the packets, and one of the ports configured to be output ports to forward ones of the packets; and
   the packet forwarding circuitry is configured to:
      receive the respective packets from the input ports; and make respective forwarding decisions for the respective packets to determine respective ones of the output ports to which to forward the respective packets.

6. The device according to claim 5, wherein:
the input ports are configured to assign input-port-specific sequence numbers to the received packets; and
the packet forwarding circuitry is configured to find missing ones of the received packets responsively to checking for missing input-port-specific sequence numbers among the assigned input-port-specific sequence numbers.

7. The device according to claim 6, wherein:
the packet forwarding circuitry is configured to assign output-port-specific sequence numbers to processed ones of the packets after the second stage of the packet processing; and
the output ports are configured to find missing ones of the processed packets responsively to checking for missing output-port-specific sequence numbers among the assigned output-port-specific sequence numbers.

8. The device according to claim 7, wherein:
the input ports are configured to assign ingress timestamps to the received packets; and
the output ports are configured to:
find delayed ones of the packets exceeding a given processing delay in the packet processing responsively to checking respective ones of the ingress timestamps against a current time; and
report the delayed packets exceeding the given processing delay.

9. The device according to claim 1, wherein:
each of the received packets includes a respective integrity check code;
the packet processing circuitry is configured to check the integrity check code of respective ones of the received packets; and
report ones of the packets failing the integrity check.

10. The device according to claim 1, wherein:
the at least one interface includes a plurality of ports;
ones of the ports are configured to be input ports to receive the packets and assign ingress timestamps to the received packets;
one of the ports are configured to be output ports and to:
forward ones of the packets;
find delayed ones of the packets exceeding a given processing delay in the packet processing responsively to checking respective ones of the ingress timestamps against a current time; and
report the delayed packets exceeding the given processing delay.

11. The device according to claim 1, wherein the at least one interface is configured to be connected to a data packet network.

12. The device according to claim 1, wherein the at least one interface includes: a network interface configured to be connected to a data packet network; and a peripheral bus interface configured to be connected to a host device.

13. A networking method, comprising:
receiving packets;
making respective forwarding decisions for respective ones of the packets;
assigning input-output port specific sequence numbers to the respective packets in a first stage of packet processing by the packet processing circuitry responsively to respective input-output port combinations of the respective packets;
checking for missing input-output port specific sequence numbers among the assigned input-output port specific sequence numbers in a second stage of packet processing by the packet processing circuitry after the first stage of packet processing by the packet processing circuitry in which the input-output port specific sequence numbers were assigned;
finding missing ones of the respective packets in the second stage of the packet processing responsively to the missing input-output port specific sequence numbers; and
reporting the missing packets.

14. The method according to claim 13, wherein:
the assigning includes assigning input-port-specific sequence numbers to the received packets; and
the finding includes finding missing ones of the received packets responsively to checking for missing input-port-specific sequence numbers among the assigned input-port-specific sequence numbers.

15. The method according to claim 13, wherein:
the assigning includes assigning output-port-specific sequence numbers to processed ones of the packets; and
the finding includes finding missing ones of the processed packets responsively to checking for missing output-port-specific sequence numbers among the assigned output-port-specific sequence numbers.

16. The method according to claim 13, wherein the making includes making respective forwarding decisions for the respective packets to determine respective output ports to which to forward the respective packets.

17. The method according to claim 16, wherein:
the assigning includes assigning input-port-specific sequence numbers to the received packets; and
the finding includes finding missing ones of the received packets responsively to checking for missing input-port-specific sequence numbers among the assigned input-port-specific sequence numbers.

18. The method according to claim 17, wherein:
the assigning includes assigning output-port-specific sequence numbers to processed ones of the packets after the second stage of the packet processing; and
the finding includes finding missing ones of the processed packets responsively to checking for missing output-port-specific sequence numbers among the assigned output-port-specific sequence numbers.

19. The method according to claim 18, further comprising:
assigning ingress timestamps to the received packets;
finding delayed ones of the packets exceeding a given processing delay in the packet processing responsively to checking respective ones of the ingress timestamps against a current time; and
reporting the delayed packets exceeding the given processing delay.

20. The method according to claim 13, wherein each of the received packets includes a respective integrity check code, the method further comprising:
checking the integrity check code of respective ones of the received packets; and
reporting ones of the packets failing the integrity check.

21. The method according to claim 13, further comprising:
assigning ingress timestamps to the received packets;
forwarding ones of the packets;

finding delayed ones of the packets exceeding a given processing delay in the packet processing responsively to checking respective ones of the ingress timestamps against a current time; and reporting the delayed packets exceeding the given processing delay.

\* \* \* \* \*